US007850229B2

(12) United States Patent
Ihashi et al.

(10) Patent No.: US 7,850,229 B2
(45) Date of Patent: Dec. 14, 2010

(54) STRUCTURE OF SIDE SILL GARNISH FOR CLOSURE STOPPER

(75) Inventors: Yoshitomo Ihashi, Dublin, OH (US); Wesley A. Johnson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 12/191,125

(22) Filed: Aug. 13, 2008

(65) Prior Publication Data

US 2010/0038931 A1 Feb. 18, 2010

(51) Int. Cl.
*B60J 5/00* (2006.01)

(52) U.S. Cl. ........................ 296/207; 296/209; 296/202; 296/146.9; 296/1.08

(58) Field of Classification Search ................. 296/209, 296/199, 202, 193.07, 187.08, 146.9, 207, 296/1.08; 49/502
See application file for complete search history.

(56) References Cited

U.S. PATENT DOCUMENTS

| | | | | |
|---|---|---|---|---|
| 2,212,551 | A | 8/1940 | Reid | |
| 3,797,857 | A | 3/1974 | Reeves | |
| 4,277,099 | A * | 7/1981 | Klein et al. | 296/146.9 |
| 4,818,014 | A * | 4/1989 | Kaye | 296/146.9 |
| 5,613,327 | A | 3/1997 | Sauve | |
| 5,992,914 | A | 11/1999 | Gotoh | |
| 6,139,089 | A | 10/2000 | Troyer | |
| 6,530,618 | B2 | 3/2003 | Nozaki et al. | |
| 7,040,682 | B2 | 5/2006 | Tokumoto | |
| 7,168,757 | B2 | 1/2007 | Futatsuhashi | |
| 7,264,302 | B2 | 9/2007 | Nagashima | |
| 7,513,518 | B1 * | 4/2009 | Mayville et al. | 280/163 |
| 2005/0218700 | A1 | 10/2005 | Yamamoto | |

FOREIGN PATENT DOCUMENTS

| | | | |
|---|---|---|---|
| JP | 402290755 | A * | 11/1990 |
| JP | 8282288 | A | 10/1996 |
| JP | 9024738 | | 1/1997 |
| JP | 2002-029261 | A | 1/2002 |

OTHER PUBLICATIONS

International Search Report of PCT/US2009/053267 dated Oct. 5, 2009.
Written Opinion of PCT/US2009/053267 dated Oct. 5, 2009.

* cited by examiner

*Primary Examiner*—Jason S Morrow
(74) *Attorney, Agent, or Firm*—Rankin Hill & Clark LLP

(57) ABSTRACT

A vehicle assembly includes a vehicle body frame, a closure connected to the vehicle body frame, a garnish connected to the vehicle body frame, and a closure stopper seat body disposed between the garnish and the vehicle body frame. The closure is movable between an open position and a closed position. The stopper seat body is configured to absorb an impact from the movable closure when the movable closure moves toward the closed position. The closure stopper seat body can be used with a number of different closures including a door, a tailgate, a trunk lid, and the like.

21 Claims, 6 Drawing Sheets

STRUCTURE OF SIDE SILL GARNISH FOR CLOSURE STOPPER

BACKGROUND

This disclosure generally relates to a structure for a sill garnish and a closure stopper for a vehicle.

FIGS. 1 and 2 depict the lower portion of a vehicle body frame 10 where a center pillar 12 extends upwardly from a side sill 14. The center pillar 12 and the side sill 14 generally define a door opening 16. A door 18, which is movable between an open position and a closed position, covers the door opening 16 when in the closed position. A side sill garnish 22 attaches to the side sill 14 below the door opening 16 to conceal and to protect the connection of the panels that make up the side sill.

As more clearly seen in FIG. 2, the side sill 14 includes an outer sill panel 24, an inner sill panel 26, and a reinforcement panel 28 disposed between the inner sill panel and the outer sill panel. A stopper seating surface 32 is formed on an outer surface 34 of the outer sill panel. The stopper seating surface 32 absorbs some of the impact when the door 18 is closed.

The door 18 includes an outer panel 36 and an inner panel 38. An opening 42 is formed in the inner panel 38 to receive a door stopper 44 that cooperates with the stopper seating surface 32. A seal 46 is also attached to the door inner panel 38 and contacts the outer surface 34 of the outer sill panel 24 when the door is in the closed position. The stopper 44 is configured to absorb an impact from the door 18 when the door moves into the closed position as is shown in FIG. 2.

It becomes difficult to use this conventional side sill and side sill garnish structure if it is desired to have the side sill garnish 22 extend vertically above the location for the stopper seating surface 32.

SUMMARY

A vehicle assembly that overcomes the aforementioned shortcomings includes a vehicle body frame, a closure connected to the vehicle body frame, a garnish connected to the vehicle body frame, and a closure stopper seat body disposed between the garnish and the vehicle body frame. The closure is movable between an open position and a closed position. The stopper seat body is configured to absorb an impact from the movable closure when the movable closure moves toward the closed position. The closure stopper seat body can be used with a number of different closures including a door, a tailgate, a trunk lid, and the like.

An example of a closure sill garnish and closure stopper seat assembly that overcomes the aforementioned difficulties includes a garnish configured to attach to a vehicle body frame of an associated vehicle and a closure stopper seat body connected with the garnish. The garnish includes an interior surface and an exterior surface. The interior surface of the garnish is configured to face the vehicle body frame when the garnish is attached to the vehicle body frame. The exterior surface of the garnish is configured to face away from the vehicle body frame when the garnish is attached to the vehicle body frame. The closure stopper seat body connects with the garnish adjacent the interior surface of the garnish so as to be positioned between the garnish and the vehicle body frame when the garnish is attached to the vehicle body frame.

A method for assembling a closure sill garnish and a closure stopper body assembly that overcomes the aforementioned difficulties includes attaching a closure sill garnish to a vehicle body frame of the vehicle and attaching a closure stopper seat body to at least one of the garnish and the vehicle body frame. According to this method, the closure stopper seat body can be disposed between the garnish and the vehicle body frame.

DETAILED DESCRIPTION

The description and drawings herein are merely illustrative and various modifications and changes can be made in the structures disclosed without departing from the scope of the invention, which is defined by the appended claims and the equivalents thereof. Like numerals refer to like and similar parts throughout the several views. Various identified components of the structures disclosed herein are merely terms of art that may vary from one manufacturer to another and should not be deemed to limit the invention.

Figure 1:
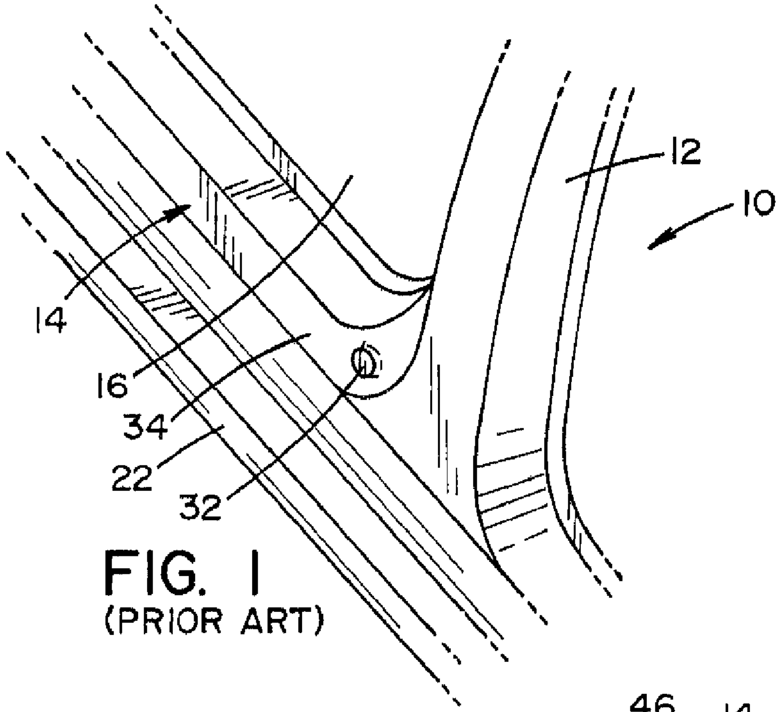
FIG. 1 (PRIOR ART)
FIG. 1 is a perspective view of the lower portion of a vehicle body frame having a conventional side sill and side sill garnish structure.
Figure 2:
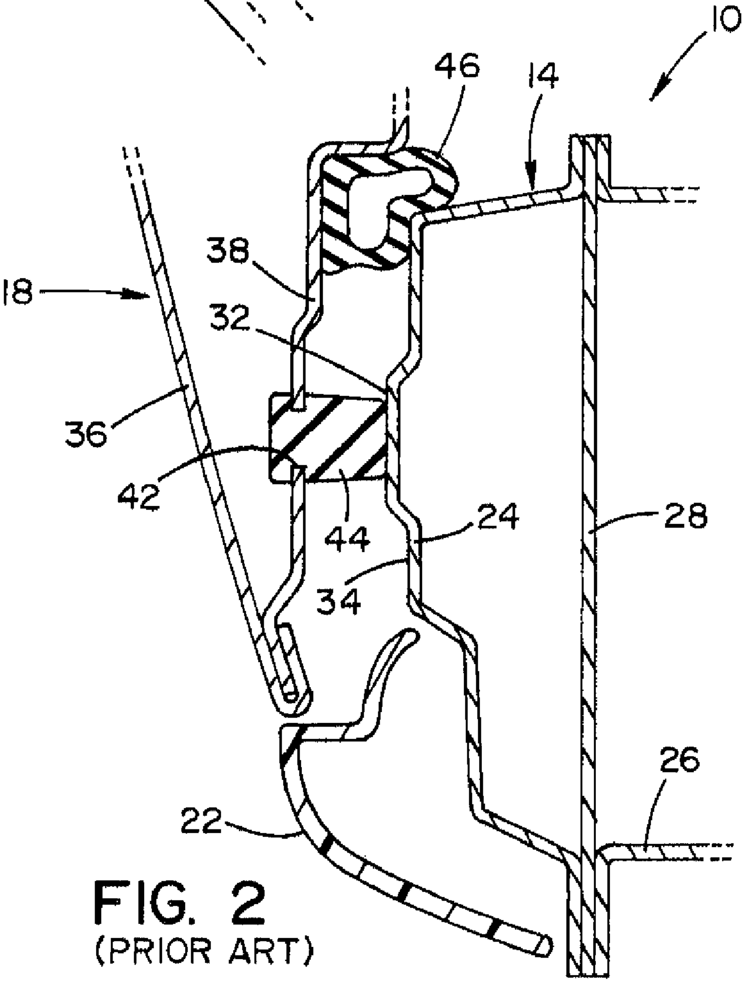
FIG. 2 (PRIOR ART)
FIG. 2 is an elevation sectional view of the lower portion of the vehicle body frame shown in FIG. 1 and a door shown in the closed position.
Figure 3:
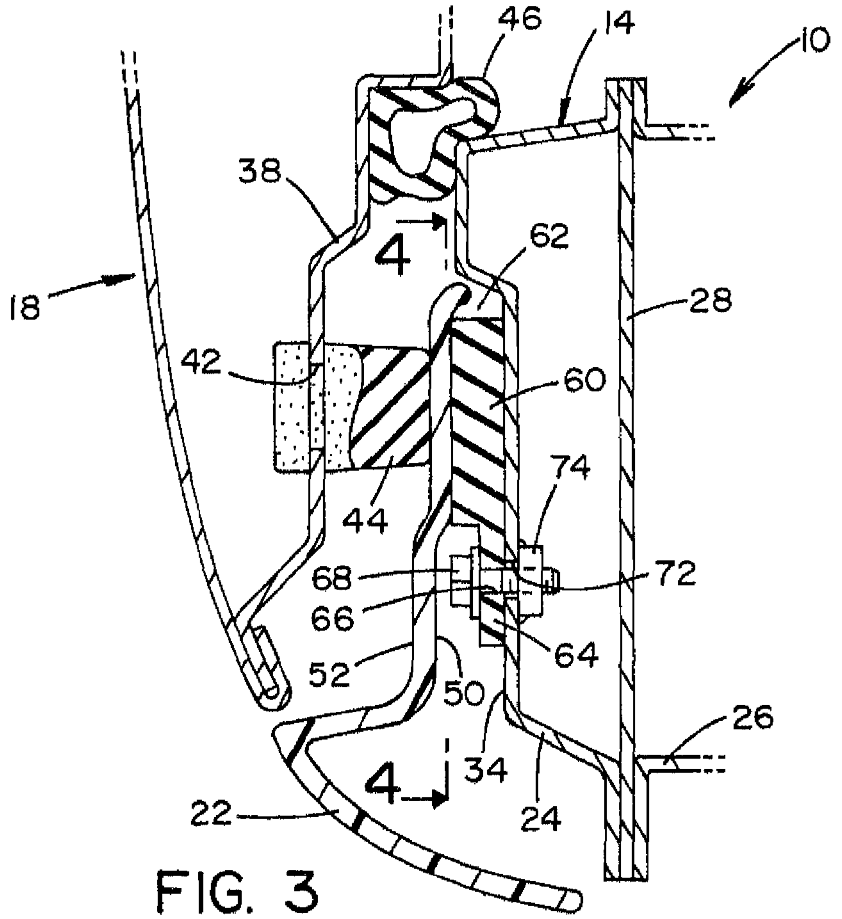
FIG. 3 is a sectional view of a lower portion of a vehicle body frame and a door including a closure stopper seat body for a new side sill and side sill garnish structure.

FIG. 3 depicts a vehicle body frame 10 and a closure, which in FIG. 3 is a door 18, connected to the vehicle body frame and movable between an open position and a closed position. Even though FIG. 3 only discloses a door 18, the closure sill garnish and closure stopper seat assembly shown in FIG. 3 can also be used with other closures such as a trunk lid and a tailgate. In FIG. 3, the garnish 22 connects to the vehicle body frame 10 and more particularly to the side sill 14 in a conventional manner, which is not shown. The garnish 22 can be attached to the outer sill member 24 using conventional fasteners such as rivets, nuts and bolts, and the like. The garnish 22 is typically an extruded piece of plastic and the side sill 14, which is made up of the outer sill panel 24, the inner sill panel 26 and the reinforcement panel 28, is typically made from metal. Different than what is shown in FIG. 1, the garnish 22 extends upwardly with respect to and terminates above a stopper seating surface. More particular to the embodiment disclosed in FIG. 3, the garnish includes an interior surface 50 and an exterior surface 52. The interior surface 50 of the garnish 22 is configured to face the vehicle body frame 10 when the garnish 22 is attached to the vehicle body frame, which is shown in FIG. 3. The exterior surface 52 of the garnish 22 is configured to face away from the vehicle body frame 10 when the garnish is attached to the vehicle body frame. The door stopper 44, which is received in the opening 42 formed in the inner door panel 38 of the door 18, contacts the exterior surface 52 of the garnish 22 when the door is moved into the closed position such as that shown in FIG. 3. The door stopper can also be integrally formed with the door, for example similar to the stopper seating surface shown in FIG. 1, or the door stopper can be absent.

Figure 4:
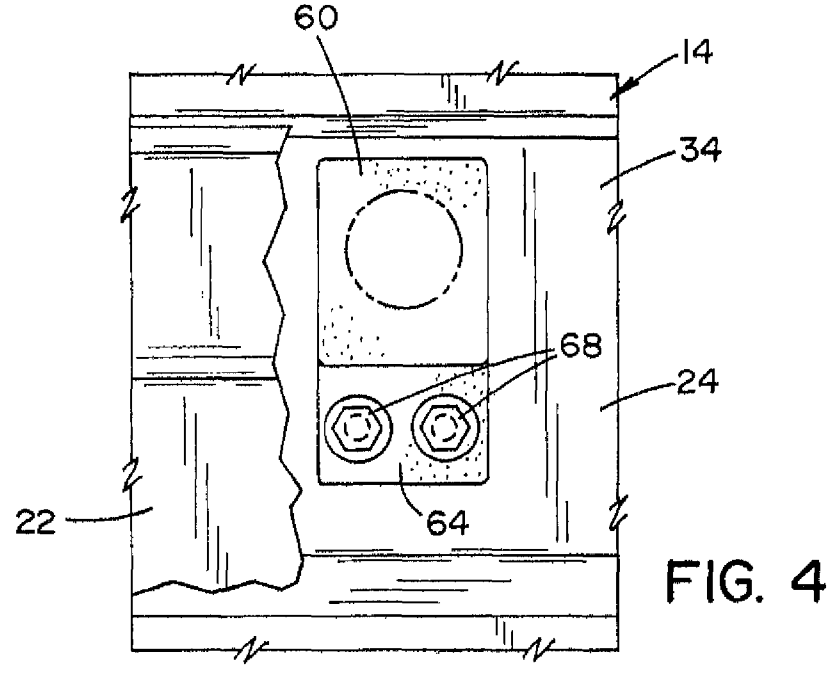
FIG. 4 is a view taken along lines 4-4 of FIG. 3.

The assembly shown in FIG. 3 includes a closure stopper seat body 60 that is configured to absorb the impact from the door 18 when the door moves towards the closed position. The stopper seat body 60 is made from a resilient material similar to the material from which the stopper 44 is made. Examples of such resilient materials include hardened rubber-like materials and the like. The stopper seat body 60 fills a void 62 between the garnish 22 and the side sill 14 that is aligned with the location where the door stopper 44 contacts the garnish. With additional reference to FIG. 4, the stopper seat body 60 is generally box-shaped and includes a lower flange 64 having openings 66 that each receive a bolt 68 to fix the stopper seat body to the vehicle body frame and more particularly to the outer sill panel 24. The outer sill panel 24 includes openings 72 aligned with the openings 66 to receive the bolts 68. A nut 74 threads onto each bolt 68. The stopper seat body 60 can attach to the vehicle body frame 10 in other conventional manners such as rivets, adhesive and the like.

In the embodiment shown in FIG. 3, the stopper seat body 60 contacts the interior surface 50 of the garnish 22 and the exterior surface 34 of the outer sill panel 24, which forms a portion of the vehicle body frame 10. When the door 18 is moved from the open position toward the closed position the stopper seat body 60 absorbs the impact from the door when the door moves into the closed position. By filling the void 62 between the garnish 22 and the vehicle body frame 10, the garnish 22 does not bend or deform greatly when contacted by the door stopper 44 thus maintaining the structural integrity of the garnish in the area where the garnish is contacted by the door stopper 44. This allows the door stopper 44 to be positioned lower with respect to the garnish 22 and the garnish can provide a seating surface for the door stopper 44, which allows the garnish to be raised higher on the side sill 14.

Figure 5:
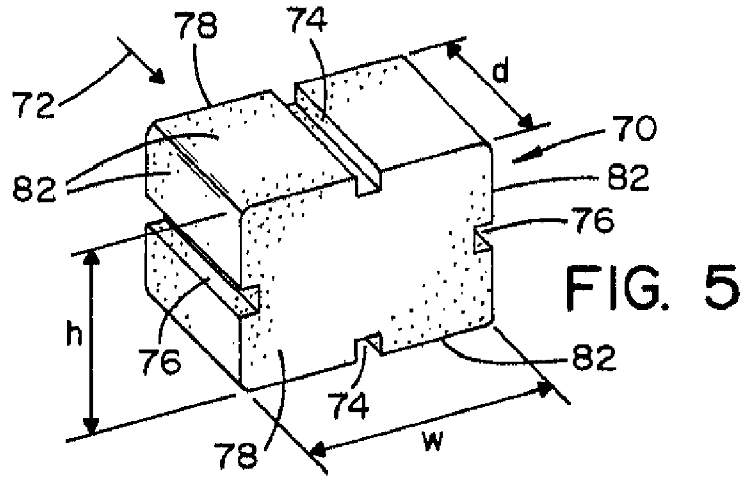
FIG. 5 is a perspective view of another embodiment of a closure stopper seat body.

With reference to FIG. 5, an alternative embodiment of a closure stopper seat body 70 is shown. This stopper seat body 70 is generally cube shaped. The stopper seat body is made in a manner which allows the stopper seat body to be disposed in a vehicle assembly or a closure sill garnish and closure stopper seat assembly in at least two orientations. This will be described in more detail below. The stopper seat body 70 is extruded in a direction along arrow 72 to provide an extruded piece of material. In the depicted embodiment, the stopper seat body 70 includes channels: the upper and lower channels 74 and side channels 76. The channels 74, 76 are formed during the extrusion process and planar surfaces 78, which are normal to the extrusion direction as indicated by arrow 72, are formed by cutting the extruded piece of material normal to the extrusion direction. Side surfaces 82 are formed by the shape of the die through which the extruded material is made. The stopper seat body 70 is made from hardened rubber-like materials and the like similar to the material from which the stopper 44 is made.

Figure 6:
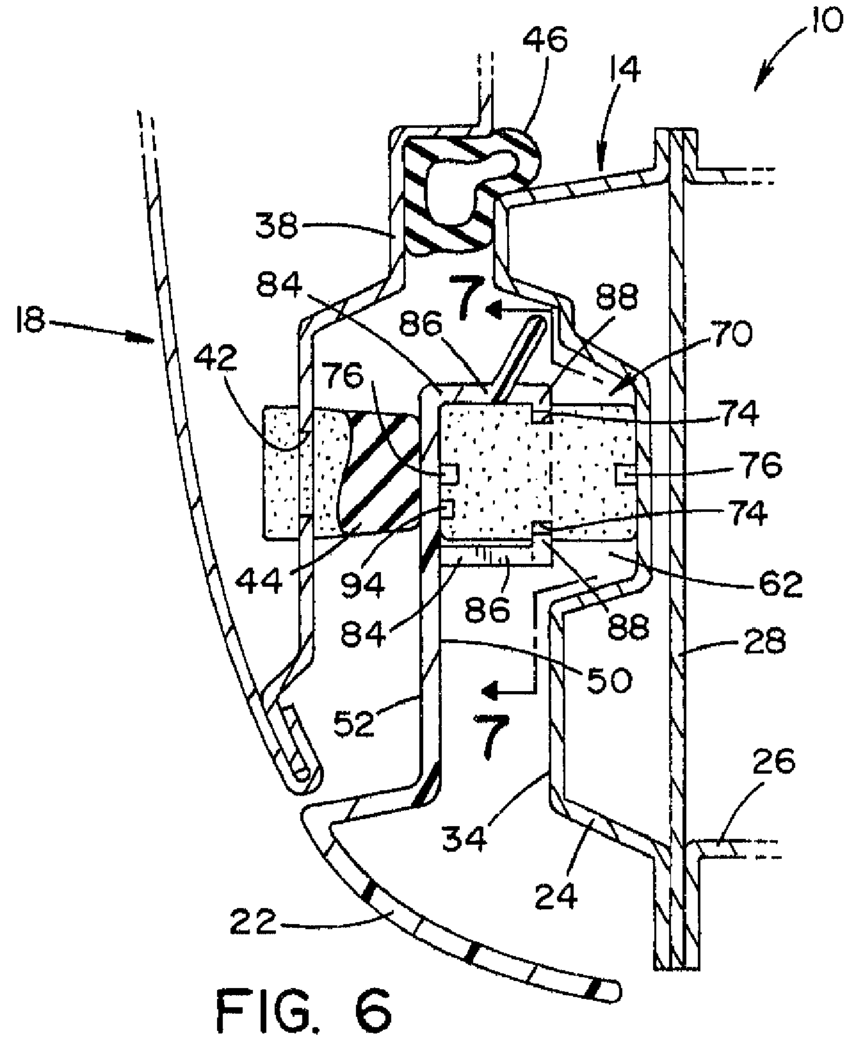
FIG. 6 is a sectional view of a lower section of the vehicle body frame and a door including the stopper seat body shown in FIG. 5 in a first orientation.

FIG. 6 depicts a vehicle body frame 10 and a closure, which in FIG. 6 is also a door 18, connected to the vehicle body frame and movable between an open position and a closed position. The closure sill garnish and closure stopper seat assembly shown in FIG. 6 can also be used with other closures found on vehicles, for example a trunk lid and a tailgate. The garnish 22 connects to the vehicle body frame at the side sill 14 in a conventional manner, with the exception that the garnish 22 extends upwardly with respect to and terminates above a stopper seating surface. The garnish 22 includes the interior surface 50 and the exterior surface 52, where the interior surface 50 faces the vehicle body frame when the garnish 22 is attached to the vehicle body frame and the exterior surface faces away from the vehicle body frame when the garnish is attached to the vehicle body frame. The door stopper 44, which is received in the opening 42 of the inner door panel 38 of the door 18, contacts the exterior surface 52 of the garnish 22 when the door is moved into the closed position. This is shown in FIG. 6.

In the assembly shown in FIG. 6, the closure stopper seat body 70 is configured to absorb the impact from the door when the door moves towards the closed position. In the illustrated embodiment, the stopper seat body 70 connects with the garnish 22 adjacent the interior surface 50 of the garnish so as to be positioned between the garnish and the vehicle body frame when the garnish is attached to the vehicle body frame. The garnish 22 includes at least one projection that extends inwardly from the interior surface 50 of the garnish that engages the stopper seat body 70 to connect the stopper seat body with the garnish. More particular to the embodiment shown in FIGS. 6-8, flange-shaped projections 84 engage with the upper and lower channels 74 of the stopper seat body. The projections 84 each have a first section 86 extending away from and generally normal to the interior surface 50 of the garnish and a second section 88 extending away from and generally normal to the first section and spaced from the interior surface of the garnish.

Figure 7:
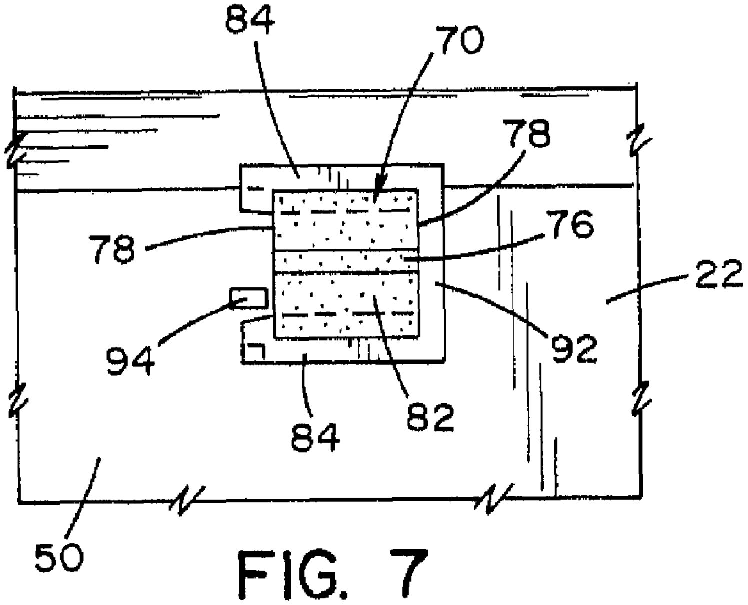
FIG. 7 is a sectional view taken along line 7-7 of FIG. 6.
Figure 8:
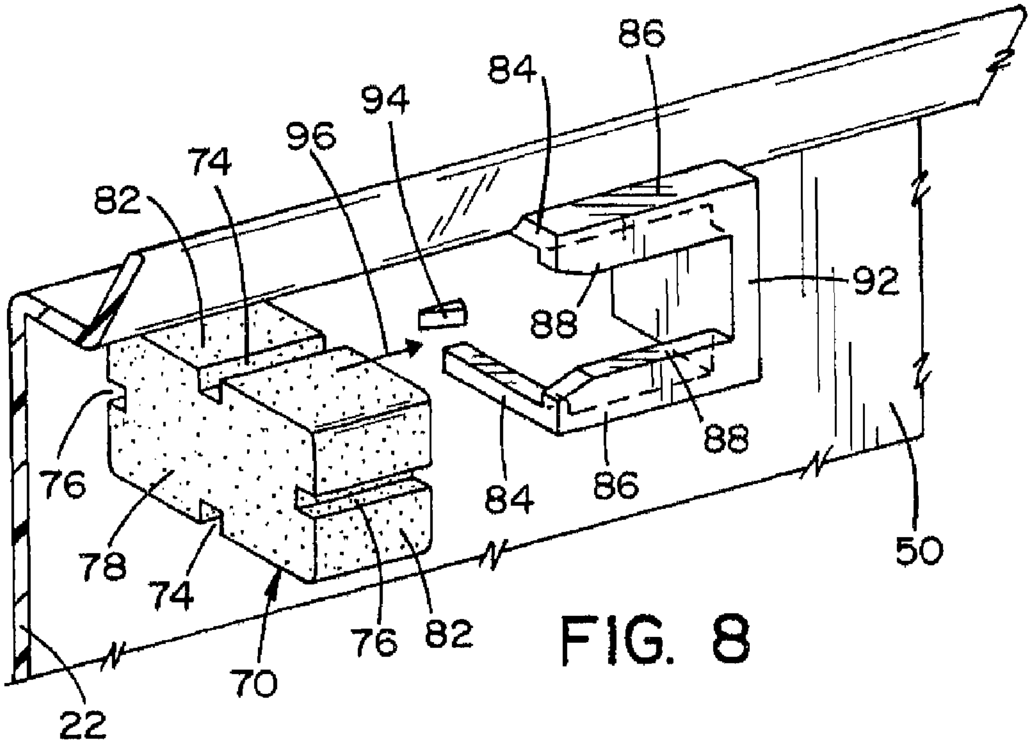
FIG. 8 is a perspective view of a closure sill garnish and closure stopper seat assembly depicting the closure stopper seat body of FIG. 5 being attached to the garnish adjacent an interior surface of the garnish.

As more clearly seen in FIGS. 7 and 8, the upper and lower projections 84 are connected at respective ends by an interconnection projection 92, which is disposed generally vertically. The projections 84 and 92 generally define a receptacle that receives the stopper seat body 70 to allow for attachment of the stopper seat body to the garnish 22. A detent 94 is disposed vertically between the upper and lower projections 84 and is spaced horizontally from the interconnection projection 92 in a direction of travel (either forward or rearward) of the vehicle to which the garnish 22 is attached. The detent 94 restrains the stopper seat body 70 from moving with respect to the garnish in the direction of travel when the stopper body has been pushed past the detent. The stopper seat body 70 attaches to the garnish 22 by moving the stopper seat body with respect to the garnish in a direction as indicated by arrow 96 (FIG. 8) that is generally parallel to a direction of travel (either forward or rearward) for the vehicle.

With reference back to FIG. 6, the stopper seat body 70 contacts the interior surface 50 of the garnish 22 and the exterior surface 34 of the outer sill panel 24. The stopper seat body 70 fills the void 62 between the garnish 22 and the vehicle body frame 10 where the door stopper 44 hits the garnish so that the garnish does not bend or deform greatly when contacted by the door stopper 44. This maintains the structural integrity of the garnish at the location where the garnish is contacted by the door stopper. This allows the door stopper 44 to be positioned lower with respect to the garnish 22 and the garnish can provide a seating surface for the door stopper, which allows the garnish to extend vertically above the location for the stopper seating surface.

Figure 9:
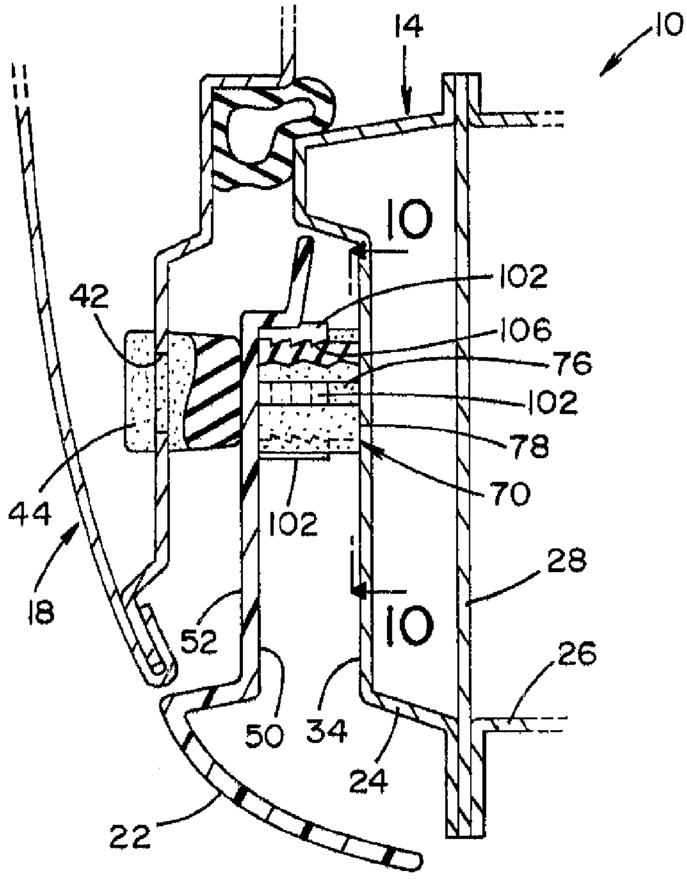
FIG. 9 is a sectional view of the lower section of the vehicle body frame and the door with the stopper seat body of FIG. 5 in a second orientation, which is rotated 90° with respect to the first orientation shown in FIG. 6.
Figure 10:
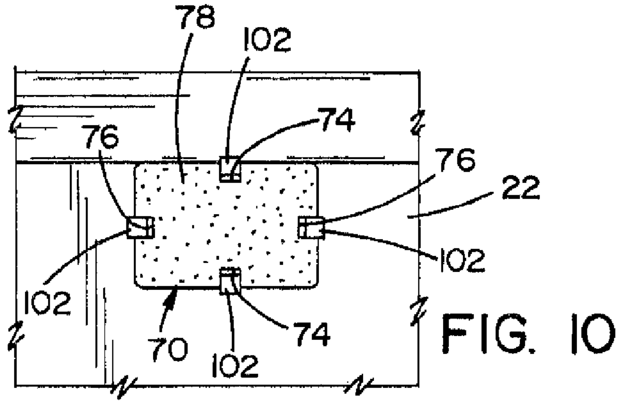
FIG. 10 is a view taken along lines 10-10 of FIG. 9.

The stopper seat body 70 is configured to be disposed in a first orientation, which is shown in FIGS. 6-8, and a second orientation, where the second orientation is where the stopper seat body is rotated at least about 90° with respect to the first orientation. The orientation of the stopper seat body 70 is contingent upon the shape and orientation of the projections on the garnish to which the stopper seat body attaches. With reference back to FIG. 5, the stopper seat body 70 is extruded having a height h a width w and is cut normal to the extrusion direction resulting in a depth d. Dependent upon the orientation of the stopper seat body 70, the depth d is determined. Not to be limited to only the examples provided below (as explained above the stopper seat body can be used with other closures such as a trunk lid and a tailgate), FIG. 6 depicts the front right door and the portion of the vehicle body adjacent thereto and FIG. 9 depicts the rear right door and the portion of the vehicle body adjacent thereto. When the stopper seat body 70 is used with the rear right door shown in FIG. 9, the depth d is different as compared to FIG. 6 while the remainder of the stopper seat body configuration remains the same. This allows one extruded piece of material to be used in different orientations and with different closure sill garnish and closure stopper seat assemblies. More particular to the embodiments described in FIGS. 6 and 9, the depth d for the stopper seat body 70 shown in FIG. 9 is approximately 3/5 the depth d for the stopper seat assembly shown in FIG. 7.

With reference to FIG. 9, the garnish 22 can also include projections 102 that extend inwardly from and generally normal to the interior surface 50 of the garnish 22. These projections 102 also form a receptacle 104 (FIG. 11) that receives the stopper seat body 70 to attach the stopper seat body to the garnish and more particularly adjacent to the interior surface 50 of the garnish. The projections 102 each include teeth 106 configured to preclude the stopper seat body 70 from moving perpendicular to the direction of travel of the vehicle.

Figure 11:
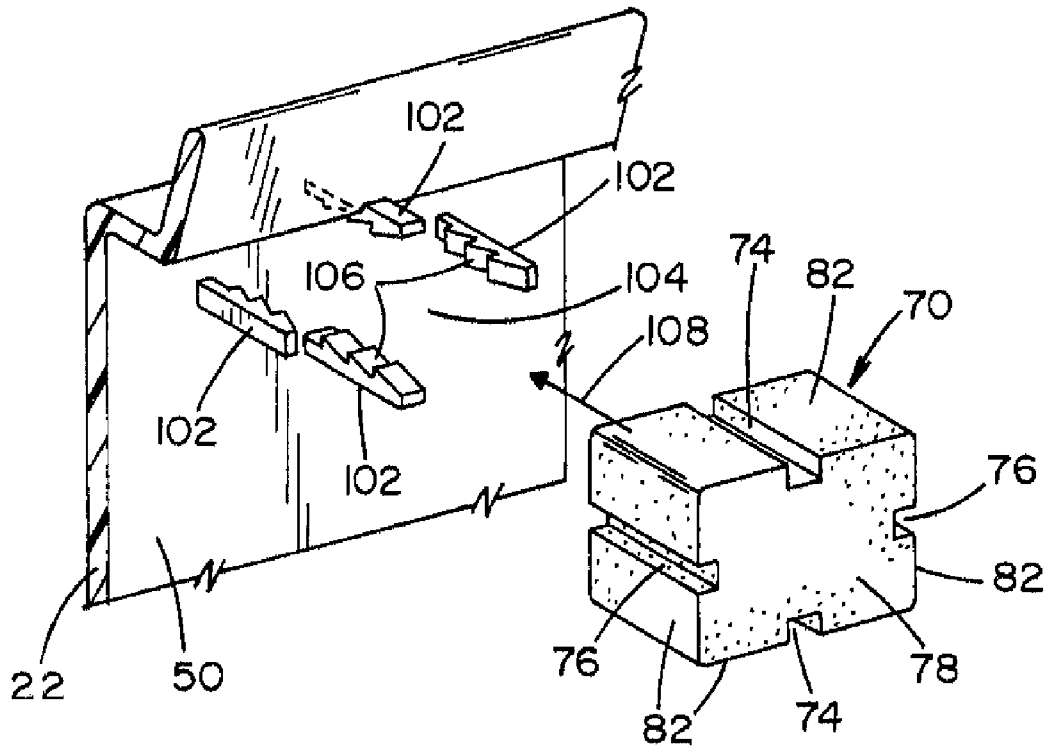
FIG. 11 is a perspective view of a closure sill garnish and closure stopper seat assembly showing the closure stopper seat body of FIG. 5 in the second orientation being attached to the garnish.

As seen when comparing FIG. 8 to FIG. 11, the orientation of the closure stopper seat body 70 is rotated 90° from the orientation shown in FIG. 8 as compared to the orientation shown in FIG. 11. Moreover the depth of the stopper seat body 70 in FIG. 11 is less than the depth of the stopper seat body in FIG. 8. Additionally, the stopper seat body 70 attaches to the garnish 22 by moving the stopper seat body with respect to the garnish in a direction (designated by arrow 108) that is generally perpendicular to the direction of travel for the vehicle. The stopper seat body 70 is pushed in the direction of arrow 108 and the projections 102 engage the channels 74 and 76 to retain the stopper seat body against the interior surface 50 of the garnish 22. With reference back to FIG. 9, in the second orientation, the stopper seat body 70 still contacts the interior surface 50 of the garnish 22 and the exterior surface 34 of the outer sill panel 24.

Figure 12:
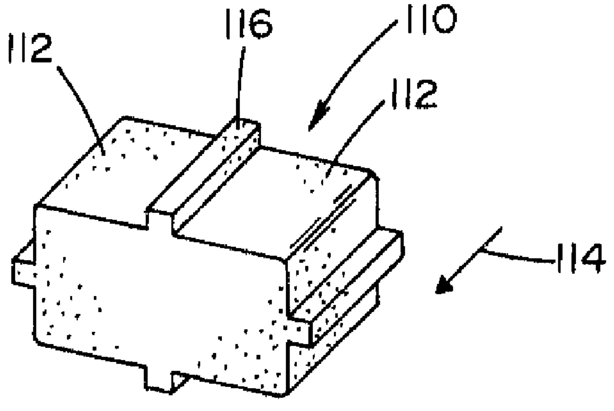
FIG. 12 is a perspective view of another embodiment of a closure stopper seat body.

The projections that extend from the garnish to engage the stopper seat body can take alternative configurations. Moreover, the configuration of the stopper seat body can also take alternative configurations as to those that are shown in FIGS. 3 and 5. One such example of a stopper seat body could be the stopper seat body 110 shown in FIG. 12 were the stopper seat body includes notches 112 formed in the body extending along a direction 114, which is the direction that the body is extruded. Similar to the stopper seat body depicted in FIGS. 5-11, stopper seat body 110 in FIG. 12 is symmetrical about two mutually perpendicular axes and the depth of the stopper seat body is a function of where the extruded piece of material is cut with respect to the extrusion direction. The notches or cut-out portions 112 and protrusions 116 defined by the notches can engage appropriately shaped projections formed on a garnish in a similar manner to those previously described. In addition to, or in lieu of, having the notches 112 or the channels 76 and 74 (for the stopper seat body 70), an opening can also be provided, for example an elongated opening, that is formed in or through the body extending along a direction of which the body is extruded. For such an example of a stopper seat body, the projections that extend inwardly from the garnish can be configured similarly to those shown in FIG. 11 and can be received inside the openings for retaining the stopper seat body adjacent the garnish and more particularly adjacent an interior surface of the garnish.

A vehicle assembly and a closure sill garnish and closure stopper seat assembly have been described with particularity. Modifications and alterations will occur to those upon reading and understanding the detailed description provided above. The invention is not limited to only the embodiments shown and described, but instead is defined by the appended claims and the equivalents thereof.

The invention claimed is:

1. A vehicle assembly comprising:
- a vehicle body frame;
- a closure connected to the vehicle body frame and movable between an open position and a closed position;
- a garnish connected to the vehicle body frame and terminating above a stopper seating surface;
- a stopper connected with the closure, the stopper contacts the garnish at the stopper seating surface when the closure is in the closed position; and
- a closure stopper seat body disposed between the garnish and the vehicle body frame and aligned with the stopper seating surface, the stopper seat body being configured to absorb an impact from the movable closure when the movable closure moves toward the closed position, wherein the stopper seat body is generally cube shaped and is configured to be disposed in a first orientation and a second orientation, the second orientation being where the stopper seat body is rotated at least about 90 degrees with respect to the first orientation.

2. The assembly of claim 1, wherein the stopper seat body contacts an interior surface of the garnish and an exterior surface of the vehicle body frame.

3. The assembly of claim 1, wherein the stopper seat body is fixed to the garnish.

4. The assembly of claim 3, wherein the stopper seat body includes at least one channel and the garnish includes at least one projection that is received in the channel to fix the stopper seat body to the garnish.

5. The assembly of claim 4, wherein the garnish includes a detent for restraining the stopper seat body from moving parallel to the direction of travel of the vehicle body frame.

6. The assembly of claim 4, wherein the at least one projection includes teeth for restraining the stopper seat body from moving perpendicular to the direction of travel of the vehicle body frame.

7. The assembly of claim 1, wherein the stopper seat body is fixed to the vehicle body frame.

8. The assembly of claim 1, wherein the stopper seat body is extruded and includes at least one channel formed therein.

9. A closure sill garnish and closure stopper seat assembly for a vehicle comprising:
- a garnish configured to attach to a vehicle body frame of an associated vehicle and having an interior surface and an exterior surface, the interior surface being configured to face the vehicle body frame when the garnish is attached to the vehicle body frame and the exterior surface being configured to face away from the vehicle body frame when the garnish is attached to the vehicle body frame;
- at least one projection extending inwardly from the interior surface of the garnish; and a generally cube-shaped closure stopper seat body connected with the garnish adjacent the interior surface of the garnish so as to be positioned between the garnish and the vehicle body frame when the garnish is attached to the vehicle body frame, the at least one projection engages the stopper seat body to connect the stopper seat body with the garnish, wherein the stopper seat body is configured to be connected with the garnish in at least two orientations, a first orientation being where the stopper is rotated about 90 degrees with respect to a second orientation, the orientation of the stopper seat body being contingent upon the shape and orientation of the projection.

10. The assembly of claim 9, wherein the at least one projection is flange shaped having a first section extending away from the interior surface of the garnish and a second section extending away from the first section and spaced from the interior surface of the garnish.

11. The assembly of claim 10, wherein the stopper seat body includes at least one channel that receives the at least one projection.

12. The assembly of claim 10, wherein the at least one projection includes an upper projection and a lower projection.

13. The assembly of claim 12, wherein the at least one projection includes an interconnection projection connecting an end of the upper projection with an end of the lower projection.

14. The assembly of claim 13, further comprising a detent disposed between the upper projection and the lower projection and spaced from the interconnection projection in a direction of travel of the associated vehicle.

15. The assembly of claim 9, wherein the at least one projection includes a plurality of projections each including teeth for engaging the stopper seat body.

16. The assembly of claim 9, wherein the stopper seat body is an extruded piece of material.

17. A method for assembling a closure sill garnish and closure stopper body assembly for a vehicle, the method comprising:

attaching a closure sill garnish to a vehicle body frame of a vehicle, wherein the garnish terminates above a location where a closure stopper or a closure contacts the garnish when in a closed position; and attaching a generally cube shaped closure stopper seat body to at least one of the garnish and the vehicle body frame, the closure stopper seat body being disposed between the garnish and the vehicle body frame in a void between the garnish and the side sill aligned with the location where the closure stopper or the closure contacts the garnish when in the closed position.

18. The method of claim 17, wherein attaching the stopper seat body further includes moving the stopper seat body with respect to the garnish in a direction that is generally parallel to a direction of travel for the vehicle.

19. The method of claim 17, wherein attaching the stopper seat body further includes moving the stopper seat body with respect to the garnish in a direction that is generally perpendicular to a direction of travel for the vehicle.

20. The method of claim 17, wherein attaching the closure sill garnish further includes fixing the stopper seat body to the vehicle body frame.

21. The method of claim 17, further comprising:

extruding a body having a height h, a width w and at least one of a channel, a notch or an opening formed in the body extending along a direction in which the body is extruded; and cutting the body generally normal to the direction in which the body is extruded to form the stopper seat body having depth d.

* * * * *